(12) United States Patent (10) Patent No.: US 11,131,602 B2
Le Maitre et al. (45) Date of Patent: Sep. 28, 2021

(54) METHOD FOR CHARACTERIZATION OF PHOTONIC DEVICES, AND ASSOCIATED DEVICE

(71) Applicant: STMicroelectronics (Crolles 2) SAS, Crolles (FR)

(72) Inventors: Patrick Le Maitre, Biviers (FR); Jean-Francois Carpentier, Grenoble (FR)

(73) Assignee: STMicroelectronics (Crolles 2) SAS, Crolles (FR)

( * ) Notice: Subject to any disclaimer, the term of this patent is extended or adjusted under 35 U.S.C. 154(b) by 112 days.

(21) Appl. No.: 16/188,537

(22) Filed: Nov. 13, 2018

(65) Prior Publication Data

US 2019/0094107 A1 Mar. 28, 2019

Related U.S. Application Data

(62) Division of application No. 15/460,425, filed on Mar. 16, 2017, now Pat. No. 10,161,830.

(30) Foreign Application Priority Data

Jul. 28, 2016 (FR) ...................................... 1657277

(51) Int. Cl.
*G01M 11/00* (2006.01)
*H04B 10/07* (2013.01)

(52) U.S. Cl.
CPC ............ *G01M 11/33* (2013.01); *G01M 11/30* (2013.01); *H04B 10/07* (2013.01)

(58) Field of Classification Search
CPC ........ G01M 11/33; G01M 11/30; H04B 10/07

USPC ......................................................... 385/134
See application file for complete search history.

(56) References Cited

U.S. PATENT DOCUMENTS

| 5,333,000 | A | * | 7/1994 | Hietala | ..................... G02F 2/02 342/368 |
| 5,546,483 | A | * | 8/1996 | Inoue | ................ G01M 11/3136 385/131 |
| 5,754,714 | A | * | 5/1998 | Suzuki | .................. B82Y 20/00 385/131 |

(Continued)

FOREIGN PATENT DOCUMENTS

GB 2425351 A 10/2006

OTHER PUBLICATIONS

INPI Search Report and Written Opinion for FR 1657277 dated May 19, 2017 (9 pages).

*Primary Examiner* — Kaveh C Kianni
(74) *Attorney, Agent, or Firm* — Crowe & Dunlevy

(57) ABSTRACT

An intermediate signal is separated into a first sub-signal and a second sub-signal according to a separation coefficient having a known real value. The first sub-signal is delivered to a first photonic circuit containing at least one photonic device to be characterized and a first photonic part. The second sub-signal is delivered to a second photonic circuit containing a second photonic part having a same transfer function as the first photonic part but lacking the at least one photonic device. Optical output signals from the first and second photonic circuits are converted into first and second electrical signals. Losses of the at least one photonic device are determined from processing the electrical signals and from the known real value of the separation coefficient.

20 Claims, 3 Drawing Sheets

(56) References Cited

U.S. PATENT DOCUMENTS

| | | | |
|---|---|---|---|
| 5,764,348 A * | 6/1998 | Bloom | G01M 11/33 356/73.1 |
| 6,038,357 A * | 3/2000 | Pan | H04J 14/02 385/11 |
| 6,459,478 B1 | 10/2002 | Schmidt et al. | |
| 6,473,541 B1 * | 10/2002 | Ho | B82Y 20/00 385/15 |
| 6,606,158 B2 | 8/2003 | Rosenfeldt et al. | |
| 6,621,947 B1 * | 9/2003 | Tapanes | G01M 11/3109 385/12 |
| 6,856,400 B1 * | 2/2005 | Froggatt | G01M 11/331 356/477 |
| 6,943,891 B2 | 9/2005 | VanWiggeren | |
| 8,213,802 B2 * | 7/2012 | Little | G02B 6/12007 398/121 |
| 8,786,843 B2 | 7/2014 | Chen | |
| 9,612,105 B2 * | 4/2017 | Kemp | A61B 5/0084 |
| 9,709,379 B2 * | 7/2017 | Kemp | G01B 9/02091 |
| 9,726,818 B1 * | 8/2017 | Yap | G01S 7/495 |
| 9,791,346 B1 | 10/2017 | Carpentier et al. | |
| 9,882,654 B1 * | 1/2018 | Yap | H04B 10/00 |
| 10,014,953 B2 * | 7/2018 | Ogawa | H04B 10/64 |
| 10,404,381 B1 * | 9/2019 | Yap | H04B 10/2575 |
| 2002/0154383 A1 * | 10/2002 | Oron | H04J 14/02 359/326 |
| 2003/0055342 A1 * | 3/2003 | Toida | A61B 3/102 600/478 |
| 2003/0063354 A1 | 4/2003 | Davidson | |
| 2004/0046963 A1 * | 3/2004 | Lackritz | G01N 21/553 356/445 |
| 2004/0208576 A1 * | 10/2004 | Kinoshita | H04J 14/0213 398/83 |
| 2004/0264836 A1 * | 12/2004 | Kawashima | G02F 1/025 385/14 |
| 2005/0185879 A1 * | 8/2005 | Dawes | G01C 19/721 385/14 |
| 2005/0195407 A1 * | 9/2005 | Nordin | G01N 21/7703 356/501 |
| 2006/0109543 A1 * | 5/2006 | Bragheri | H01S 3/06758 359/334 |
| 2006/0222282 A1 * | 10/2006 | Salib | G02F 1/0955 385/11 |
| 2006/0222377 A1 * | 10/2006 | Hoshida | H04B 10/60 398/212 |
| 2009/0244544 A1 * | 10/2009 | Terrel | G01C 19/727 356/461 |
| 2010/0277726 A1 * | 11/2010 | Logan, Jr. | G01J 3/42 356/326 |
| 2011/0122895 A1 * | 5/2011 | Savage-Leuchs | H01S 3/1022 372/10 |
| 2011/0158576 A1 * | 6/2011 | Kissa | G02F 1/225 385/3 |
| 2012/0093457 A1 * | 4/2012 | Sakamaki | H04B 10/65 385/14 |
| 2013/0188971 A1 * | 7/2013 | Painchaud | G02B 6/126 398/214 |
| 2013/0209020 A1 * | 8/2013 | Doerr | G02F 1/011 385/2 |
| 2014/0118748 A1 * | 5/2014 | Rubio Guivernau | G02B 6/3586 356/479 |
| 2014/0376001 A1 * | 12/2014 | Swanson | G01N 21/4795 356/479 |
| 2015/0354938 A1 * | 12/2015 | Mower | G06N 20/00 356/477 |
| 2017/0207603 A1 * | 7/2017 | Evans | H04B 10/506 |
| 2017/0241765 A1 * | 8/2017 | Adie | G01B 9/02012 |
| 2019/0154738 A1 * | 5/2019 | Bohnert | G01R 15/246 |

* cited by examiner

METHOD FOR CHARACTERIZATION OF PHOTONIC DEVICES, AND ASSOCIATED DEVICE

PRIORITY CLAIM

This application is a divisional from U.S. patent application Ser. No. 15/460,425 filed Mar. 16, 2017, which claims the priority benefit of French Application for Patent No. 1657277, filed on Jul. 28, 2016, the disclosures of which are hereby incorporated by reference in their entireties.

TECHNICAL FIELD

Various embodiments of the invention and their implementation relate to photonic devices and, in particular, to test circuits allowing for the characterization of photonic devices in order, for example, to determine the optical losses that they incur.

BACKGROUND

There exist means for characterizing photonic devices in which two identical optical signals are coupled to the input of two different photonic circuits, and the optical output signals from the two circuits are compared.

However, the coupling of an optical signal, for example of an optical fiber from/to a photonic circuit, can be a source of significant uncertainties. Indeed, the losses of the optical signal due to the network coupler are very dependent on the alignment and on the inclination of the optical fiber with respect to the coupler.

Thus, it is difficult to obtain identical input and output couplings between the two circuits to be compared, which renders the characterization of the photonic devices difficult.

SUMMARY

According to one embodiment, a method is provided for characterizing a photonic device which is independent of the characteristics of the optical input signal.

According to one aspect, a method is provided for characterizing at least one photonic device comprising: reception of an optical input signal, separation of an intermediate signal coming from the input signal into at least a first sub-signal and a second sub-signal according to a separation coefficient having a known real value, delivery of the at least a first sub-signal to at least a first photonic circuit containing the at least one photonic device and a first photonic part, delivery of the second sub-signal to a second photonic circuit containing a second photonic part having the same transfer function as the first photonic part, and lacking the at least one photonic device, conversion of the output signals from the circuits into electrical signals, and determination of the optical losses of the at least one photonic device from the electrical signals and from the known real value of the separation coefficient.

In other words, a single optical input signal is used which allows the implementation of several optical couplings to be avoided, which allows, on the one hand, a gain in time and, on the other hand, more precise measurements.

The intermediate signal may be the signal coming from an optical coupler receiving the input signal or else an optical signal already having undergone one or more optical separations which allows the separation coefficient to be precisely determined.

In this regard, according to one embodiment, the separation of the intermediate signal is carried out in a separator having the separation coefficient whose real value is equal to a known theoretical value to a given precision, the method furthermore comprising: a first separation of a first signal coming from the input signal into a third sub-signal and a fourth sub-signal via a second separator, a second separation of the fourth sub-signal via a third separator into a fifth sub-signal and a sixth sub-signal forming the intermediate signal, the first and second separations being applied with the separation coefficient, a conversion of the third and fifth sub-signals into electrical signals and a determination of the real value of the separation coefficient from the electrical signals coming from the third and fifth sub-signals.

In other words, in the case where the separations are carried out in an identical manner, in other words in successive separators having the same separation coefficient, it is possible to determine the separation coefficient with precision using the powers of the output signals from the two separators.

The method may furthermore comprise: a separation of the intermediate signal into several sub-signals, a transmission of one of these sub-signals to the second circuit, a transmission of the other sub-signals to separate circuits each containing a different photonic device and the first photonic part, a conversion of the output signals from the circuits into electrical signals, and a determination of the optical losses of the photonic devices from the electrical signals and from the real value of the separation coefficient.

According to another aspect, a test device is provided for the characterization of at least one photonic device, comprising: means for receiving an optical input signal, first separation means configured for separating an intermediate signal coming from the input signal into at least a first sub-signal and a second sub-signal according to a separation coefficient having a known real value, at least a first circuit containing the at least one photonic device and configured for receiving the at least a first sub-signal, a second photonic circuit containing a second photonic part having the same transfer function as the first photonic part, and lacking the at least one device, and configured for receiving the second sub-signal, and means of converting the output signals from the circuits into electrical signals.

According to one embodiment, the separation means may be optical separators having the separation coefficient whose real value is equal to a known theoretical value to a given precision, and the device furthermore comprises: second separation means configured for separating a first signal coming from the input signal into a third sub-signal and a fourth sub-signal, and third separation means configured for separating the fourth sub-signal into a fifth sub-signal and a sixth sub-signal forming the intermediate signal, the second and third separation means having the separation coefficient, and second conversion means configured for converting the third and fifth sub-signals into electrical signals.

According to one embodiment, the device may comprise a plurality of circuits each containing a different photonic device and the photonic part, and fourth separation means may then be configured for: separating the intermediate signal into a plurality of sub-signals, transmitting one of these signals to the second photonic circuit, and transmitting the other sub-signal to each of the circuits comprising a photonic device, the device furthermore comprising second conversion means configured for converting the output signals from the circuits into electrical signals.

The conversion means may comprise photodiodes configured for converting the output signals from the circuits into electrical signals.

The device may comprise output terminals designed to be coupled to determination means configured for determining the optical losses of the at least one photonic device from the powers of the electrical signals and from the known real value of the separation coefficient.

According to another aspect, a photonic integrated circuit is provided comprising at least one test device such as previously described.

The integrated circuit may comprise a plurality of test devices, fifth separation means configured for separating a first signal coming from an optical input signal into a plurality of input sub-signals and for transmitting each sub-signal to one test device from the plurality of test devices.

According to another aspect, a test structure is provided, comprising at least one test device such as previously described, and determination means configured for determining the optical losses of the at least one photonic device from the powers of the electrical signals and from the known real value of the separation coefficient.

The determination means may be configured for determining the real value of the separation coefficient from the electrical signals coming from the third and fifth sub-signals.

The determination means may be configured for determining the optical losses of the photonic devices based on the electrical signals coming from the photonics circuits containing a photonic device and on the real value of the separation coefficient.

The at least one test device included in the structure may be incorporated within an integrated circuit.

BRIEF DESCRIPTION OF THE DRAWINGS

Other advantages and features of the invention will become apparent upon examining the detailed description of non-limiting embodiments of the invention and their implementation and from the appended drawings in which.

DETAILED DESCRIPTION

Figure 1:
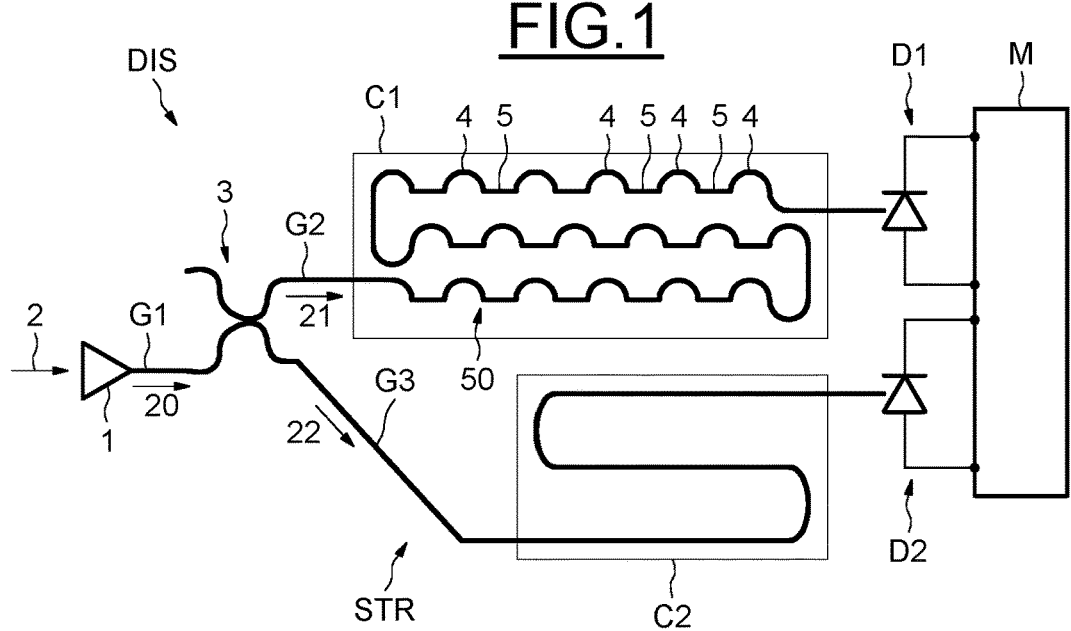
FIG. 1 is a schematic representation of a test structure.

FIG. 1 is a schematic representation of a test structure STR incorporating a test device DIS according to one embodiment. This test device may be disposed on a semiconductor wafer comprising photonic integrated circuits, within the dicing gaps (i.e., scribe lines) between the circuits or inside of the circuits themselves. This test device is then fabricated at the same time as various photonic devices that the photonic circuits comprise.

The test device DIS comprises a network coupler 1, configured for receiving an optical input signal 2, for example an optical signal coming from an optical fiber external to the test device DIS, and transmitting it to the device in the form of a first optical signal 20.

The network coupler 1 is coupled to a first waveguide G1, itself coupled to an optical separator 3. The optical separator 3 can conventionally be an adiabatic coupler.

In this example, the separator 3 has a separation coefficient K with a theoretical value of 0.9, in other words an intermediate signal, here the first signal 20, transmitted to the input of the separator 3 will be separated into a first sub-signal 21, whose power is equal to 90% of the power of the first signal 20, and a second signal 22 whose power is equal to 10% of the power of the first signal 20.

It should be noted that, in certain cases, it is possible to have imprecisions with respect to the theoretical value of the separation coefficient of the optical separator 3, of the order of a few %, due notably to the method of fabrication. It is however considered, in this embodiment, that the imprecisions on the separation coefficient are zero, and that here the real value of the separation coefficient is equal to its theoretical value.

The first sub-signal 21 is, for example, transmitted to a first circuit C1 via a second waveguide G2 connected between a first output of the first separator 3 and the input of the first circuit C1, and the second sub-signal 22 is transmitted to a second circuit C2 via a third waveguide G3 connected between a second output of the first separator 3 and the input of the second circuit C2.

The first circuit C1 here comprises a plurality of photonic devices 4 to be tested, for example here curved waveguides in the form of a strip ('strip waveguide' according to terminology well known to those skilled in the art) disposed in a cascaded fashion between the input and the output of the circuit C1. The curved waveguides are connected in pairs by non-curved waveguides 5, for example 'rib waveguides' (according to the terminology). These non-curved waveguides 5 here form a first photonic part 50.

All of the photonic devices to be tested have a first transfer function H1 and the first photonic part has a second transfer function H2.

Thus, the transfer function of the first circuit C1 is equal to the product of the first transfer function and the second transfer function H2.

The second circuit C2 is analogous to the first circuit C1, but does not comprise the devices to be tested. Thus, the second circuit C2 comprises only a second photonic part having a transfer function identical to the second transfer function H2.

The outputs of the two circuits C1 and C2 are coupled to photodiodes D1 and D2 allowing the output signals from these circuits to be converted into electrical signals. The determination of the output powers PC1 and PC2, respectively from the first circuit C1 and from the second circuit C2, is therefore carried out by reading the current of the photodiodes and hence does not require any optical coupling.

The structure STR also comprises a determination circuit M, coupled to the test device and, more particularly, to the output of the photodiodes, and configured for determining the losses due to the photonic devices 4. The determination circuit M as here, for example, a processing device such as a computer with installed software executable thereon. The computer may, for example, be connected to the photodiodes by means of electrical connection lugs (terminals) formed on the device.

The determination of the losses due to the photonic devices 4 is carried out by determining the first transfer function H1 of the plurality of photonic devices 4.

More particularly, the output powers PC1 and PC2 from the two circuits C1 and C2 verify the following equations:

$$PC1 = P0 * K * H1 * H2$$

$$PC2 = P0 * (1-K) * H2$$

with P0 equal to the power of the first signal 20, or here the intermediate signal.

It should be noted here that the losses generated by the waveguides G1, G2 and G3 are negligible owing to the small difference between the optical path leading to the first circuit C1 and the optical path leading to the second circuit C2.

Thus, using these two equations, the first transfer function H1 of the plurality of photonic devices 4 is obtained by the application of the formula $$H1 = \frac{1-K}{K} * \frac{PC1}{PC2}$$

Obtaining the first transfer function H1 of the second circuit does not therefore depend on the first signal 20, and nor does it therefore depend on the input signal 2, but only on the separation coefficient K and on the output powers PC1 and PC2 from the circuits C1 and C2.

Thus, the determination of the first transfer function H1 of the plurality of photonic devices 4 does not depend on any potential imprecisions in coupling between the optical fiber and the coupler 1.

Furthermore, by obviating the use of several optical inputs and/or of several optical outputs, the time spent in the alignment between the fibers and the couplers is saved and the uncertainty on the measurement linked to the quality of this alignment is reduced.

Whereas in the embodiment that has just been described it is considered that the real value K of the separation coefficient was known, an embodiment allowing this real value to be determined will now be described with reference to FIG. 2.

Figure 2:
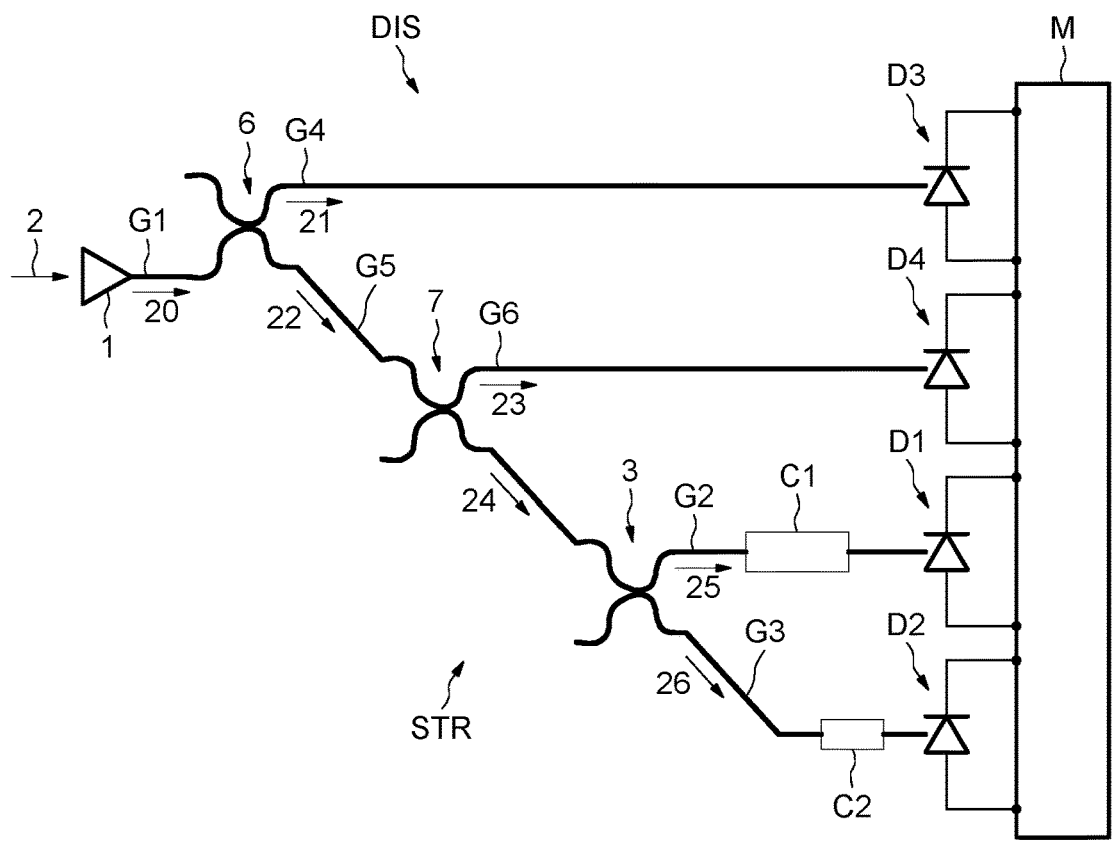
FIGS. 2-3 illustrate embodiment including multiple optical separators.

FIG. 2 illustrates schematically one embodiment in which the device DIS further comprises two separators 6 and 7 disposed upstream of the device previously described and illustrated in FIG. 1. In this figure and in the following ones, the circuits C1 and C2 are shown more schematically for the sake of simplification.

In this embodiment, the theoretical values of the separation coefficients of the separators 3, 6 and 7 are known to given precisions in fabrication, in other words their real values are not known.

Since the separators 3, 6, and 7 are formed close to one another on the semiconductor wafer, all three are identical. The same is true for the imprecisions on the separation coefficients which are identical from one separator to another.

Thus, the real separation coefficient K of the separators, although it can vary slightly with respect to its theoretical value, will be the same for each separator.

The second separator 6 has its input connected to the first waveguide G1, in order to receive the first signal 20.

Since the second separator 6 is identical to the first separator 3, its separation coefficient K is also 0.9, to a given precision.

Thus, a third sub-signal 21, whose power is equal to around 10% of the power of the first signal 20, is transmitted to a fourth waveguide G4 and a fourth sub-signal 22, whose power is equal to around 90% of the power of the first signal 20, is transmitted to a fifth waveguide G5.

The powers P21 and P22 of the third and fourth sub-signals therefore verify the equations $$P21=(1-K)*P0$$

$$P22=K*P0$$

The fourth waveguide G4 is connected to a third photodiode D3, and the fifth waveguide G5 is connected to a third separator 7.

The third separator 7, identical to the first separator 3, divides the signal into a fifth sub-signal 23, whose power is equal to around 10% of the power of the fourth sub-signal 22, and into a sixth sub-signal 24, whose power is equal to around 90% of the power of the fourth sub-signal 22.

The fifth sub-signal 23 is transmitted to a fourth photodiode D4 by means of a sixth waveguide G6, and the sixth sub-signal 24 is transmitted to the first optical separator 3.

In this embodiment, the sixth sub-signal 24 forms the intermediate signal received by the first separator 3.

The powers P23 and P24 of the fourth and fifth sub-signals 23 and 24 therefore verify the equations $$P23=(1-K)*P22=K*(1-K)*P0$$

$$P24=K*P22=K^2*P0$$

It should be noted here that, although the coefficient K can have any given value, it must be chosen in such a manner that the signals arriving on the various diodes of the device have a power higher than the sensitivity thresholds of the diodes.

The determination circuit M is, in this embodiment, configured for determining the separation coefficient K of the optical separators. This is notably possible by the application of the following formula $$K = \frac{P23}{P21}$$

Thus, by reading the currents of the diodes D3 and D4 connected to the output of the couplers 6 and 7, it is possible to determine with precision the real separation coefficient of the optical couplers 3, 6, and 7. Here, imprecisions due to the process of fabrication of the separators are therefore not a factor.

The sixth sub-signal 24, or here intermediate signal, is subsequently transmitted to the first optical separator 3, then separated and transmitted to the first circuit C1 and to the second circuit C2, according to the method previously described and illustrated in FIG. 1.

Therefore, by measuring the real value of the separation coefficient K, a precise determination is obtained of the first transfer function H1 of the plurality of photonic elements 4.

Figure 3:
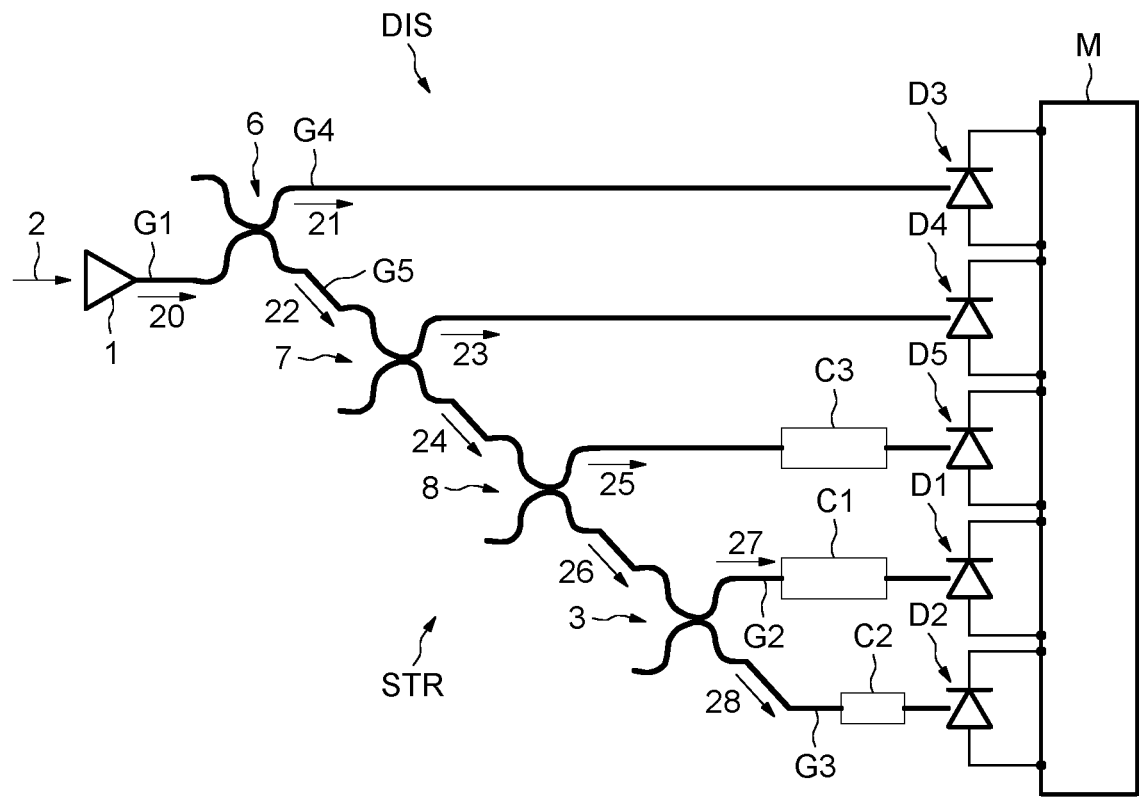

FIG. 3 illustrates one embodiment in which the device DIS comprises a fourth optical separator 8, identical to the separators 3, 6, and 7, and a third photonic circuit C3.

The third photonic circuit C3 is connected to the output of the fourth separator 8, itself connected to the output of the third separator 7, in order to receive a seventh sub-optical signal 25 whose power is equal to around 10% of the power of the sixth sub-signal 24, or here the intermediate signal.

The third circuit C3 comprises a plurality of second photonic devices to be tested, for example here curved waveguides in the form of a strip having a radius of curvature different from the waveguides 4 of the first circuit C1, disposed in a cascaded fashion between the input and the output of the third circuit C3. The curved waveguides are connected in pairs via conventional waveguides 5, in such a manner that the third circuit C3 has a disposition analogous to that of the first circuit C1, the second photonic devices replacing the first photonic devices 5.

The output of the third circuit C3 is connected to a fifth photodiode D5 allowing the output signal from the third circuit C3 to be converted into an electrical signal.

Thus, the transfer function of the third circuit C3 is equivalent to the product of a third transfer function H3, corresponding to the plurality of second photonic elements, and the second transfer function H2 corresponding to all of the waveguides 5.

The output powers PC2 and PC3 from the second and third circuits therefore verify the following equations $$PC2 = P0 * (1-K) * K^3 * H2$$

$$PC3 = P0 * K^2 (1-K) * H3 * H2$$

Thus, the determination circuit M can determine the third transfer function H3 by the application of the formula $$H3 = \frac{PC3}{PC2} * K$$

It is therefore possible to determine the losses due to two different types of photonic devices with a single optical coupling, independently of the coupling imprecisions of the input signal.

Figure 4:
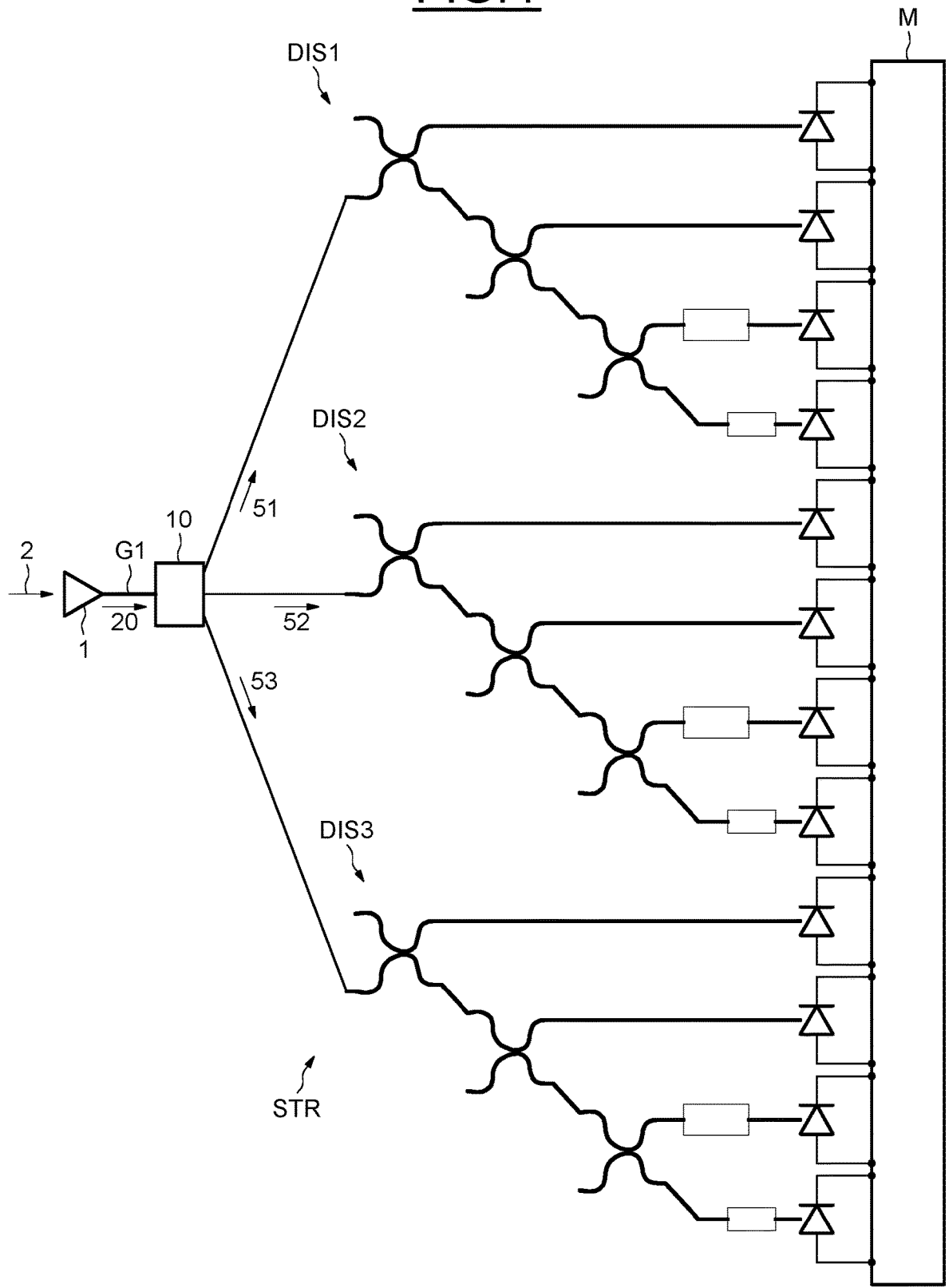
FIG. 4 illustrates the use of plural test devices.

Since the devices described in what precedes and illustrated in FIGS. 1 to 3 operate independently of the value of the power of their input signal, it may also be envisaged, as illustrated in FIG. 4, to fabricate, on the same photonic chip, a plurality of test devices DIS1, DIS2, DIS3, whose input signals come from a fifth optical separator 10, configured for receiving the first signal 20 and for dividing it into a plurality of sub-signals S1, S2, S3 according to any given coefficient, each sub-signal corresponding to the input signal of one of the devices DIS1, DIS2, and DIS3.

Thus, it is possible to characterize several different photonic devices on the same chip and with a single optical coupling, thus rendering the characterization more precise and faster.

The invention claimed is:

1. A circuit, comprising:
a first optical separator configured to separate a first signal derived from an optical input signal into a first sub-signal and a second sub-signal according to a separation coefficient having a theoretical value;
a second optical separator configured to separate the second sub-signal into a third sub-signal and a fourth sub-signal according to the separation coefficient having the theoretical value;
a third optical separator configured to separate the fourth sub-signal into a fifth sub-signal and a sixth sub-signal according to the separation coefficient having the theoretical value;
a first photonic circuit configured to receive the fifth sub-signal and containing at least one photonic device and a first photonic part;
a second photonic circuit configured to receive the sixth sub-signal and containing a second photonic part having a same transfer function as the first photonic part and lacking the at least one photonic device;
circuitry configured to convert the first and third sub-signals into first and second electrical signals, respectively, and convert output optical signals from the first and second photonic circuits into third and fourth electrical signals, respectively; and
a processing circuit configured to determine a real value of the separation coefficient from the first and second electrical signals and determine optical losses of the at least one photonic device from the third and fourth electrical signals and the determined real value of the separation coefficient.

2. The circuit of claim 1, wherein the determined optical losses represent a transfer function of the at least one photonic device.

3. The circuit of claim 1, wherein the processing circuit determines optical losses by calculating a ratio of third electrical signal power to fourth electrical signal power and multiplying the ratio by a constant derived from the determined real value of the separation coefficient.

4. The circuit of claim 1, wherein the circuitry configured to convert comprises photosensing circuits that receive the first and third sub-signals and generate the first and second electrical signals.

5. The circuit of claim 4, wherein the photosensing circuits are photodiodes.

6. The circuit of claim 1, wherein said processing circuit determines the real value of the separation coefficient by calculating a ratio of second electrical signal power to first electrical signal power.

7. The circuit claim 1, wherein the circuitry configured to convert the first and third sub-signals comprises photosensing circuits that receive the first and third sub-signals and generate the first and second electrical signals.

8. The circuit of claim 7, wherein the photosensing circuits are photodiodes.

9. The circuit claim 1, wherein the first and second optical separators are identical to each other and are supported on a semiconductor wafer.

10. The circuit of claim 1, wherein the first, second and third optical separators are identical to each other and are supported on a semiconductor wafer.

11. A circuit, comprising:
a first optical separator configured to separate a first signal derived from an optical input signal into a first sub-signal and a second sub-signal according to a first separation coefficient having a theoretical value;
a second optical separator configured to separate the second sub-signal into a third sub-signal and a fourth sub-signal according to a second separation coefficient having the same theoretical value;
a third optical separator configured to separate the fourth sub-signal into a fifth sub-signal and a sixth sub-signal according to a third separation coefficient having the same theoretical value;
a first photonic circuit configured to receive the fifth sub-signal and containing at least one photonic device and a first photonic part;
a second photonic circuit configured to receive the sixth sub-signal and containing a second photonic part having a same transfer function as the first photonic part and lacking the at least one photonic device;
circuitry configured to convert the first and third sub-signals into first and second electrical signals, respectively, and convert output optical signals from the first and second photonic circuits into third and fourth electrical signals, respectively; and
a processing circuit configured to determine a real value of the first and second separation coefficients from the first and second electrical signals and determine optical losses of the at least one photonic device from the third and fourth electrical signals and the determined real value of the first and second separation coefficients.

12. The circuit of claim 11, wherein the determined optical losses represent a transfer function of the at least one photonic device.

13. The circuit of claim 11, wherein the processing circuit determines optical losses by calculating a ratio of third electrical signal power to fourth electrical signal power and multiplying the ratio by a constant derived from the determined real value of the first and second separation coefficients.

14. The circuit of claim 11, wherein the circuitry configured to convert comprises photosensing circuits that receive the first and third sub-signals and generate the first and second electrical signals.

15. The circuit of claim 14, wherein the photosensing circuits are photodiodes.

16. The circuit of claim 11, wherein the first, second and third optical separators are identical to each other and are supported on a semiconductor wafer.

17. The circuit of claim 11, wherein said processing circuit determines the real value of the first and second separation coefficient by calculating a ratio of second electrical signal power to first electrical signal power.

18. The circuit claim 11, wherein the circuitry configured to convert the first and third sub-signals comprises photosensing circuits that receive the first and third sub-signals and generate the first and second electrical signals.

19. The circuit of claim 18, wherein the photosensing circuits are photodiodes.

20. The circuit claim 11, wherein the first and second optical separators are identical to each other and are supported on a semiconductor wafer.

* * * * *